US007606763B2

(12) United States Patent
Frankel

(10) Patent No.: US 7,606,763 B2
(45) Date of Patent: Oct. 20, 2009

(54) SYSTEMS AND METHODS FOR IMPROVING AUCTION LIQUIDITY

(75) Inventor: Oliver L. Frankel, New York, NY (US)

(73) Assignee: Longitude LLC, New York, NY (US)

( * ) Notice: Subject to any disclaimer, the term of this patent is extended or adjusted under 35 U.S.C. 154(b) by 266 days.

(21) Appl. No.: 11/342,163

(22) Filed: Jan. 27, 2006

(65) Prior Publication Data

US 2006/0173774 A1 Aug. 3, 2006

Related U.S. Application Data

(60) Provisional application No. 60/648,916, filed on Feb. 1, 2005.

(51) Int. Cl.
*G06Q 40/00* (2006.01)
(52) U.S. Cl. .............. 705/39; 705/35; 705/36; 705/37; 705/38; 705/40; 705/41; 705/42; 705/43; 705/44; 45/67
(58) Field of Classification Search ............ 705/35–45, 705/67
See application file for complete search history.

(56) References Cited

U.S. PATENT DOCUMENTS

| 6,321,212 | B1* | 11/2001 | Lange ............... 705/36 R |
|---|---|---|---|
| 7,136,833 | B1* | 11/2006 | Podsiadlo ............ 705/37 |
| 7,376,628 | B2* | 5/2008 | Johnson ............. 705/67 |
| 2002/0138401 | A1* | 9/2002 | Allen et al. ........... 705/37 |
| 2002/0147670 | A1* | 10/2002 | Lange ............... 705/35 |
| 2003/0115128 | A1* | 6/2003 | Lange et al. ......... 705/37 |
| 2003/0115131 | A1* | 6/2003 | Heaton et al. ........ 705/37 |
| 2003/0172019 | A1* | 9/2003 | Getty ............... 705/36 |
| 2003/0177086 | A1* | 9/2003 | Gomber et al. ....... 705/37 |
| 2004/0006528 | A1* | 1/2004 | Fung ................ 705/37 |
| 2004/0006529 | A1* | 1/2004 | Fung ................ 705/37 |
| 2004/0024692 | A1* | 2/2004 | Turbeville et al. ..... 705/38 |
| 2004/0111358 | A1* | 6/2004 | Lange et al. ......... 705/37 |
| 2004/0167845 | A1* | 8/2004 | Corn et al. .......... 705/37 |
| 2005/0114255 | A1* | 5/2005 | Shields et al. ........ 705/37 |
| 2006/0167773 | A1* | 7/2006 | Yang et al. .......... 705/35 |

OTHER PUBLICATIONS

Nebraska Lottery Regulations, 101.4, 304.02, 702.3.*
EPA 1594075, Specified Return Denominator.*

* cited by examiner

*Primary Examiner*—Charles R Kyle
*Assistant Examiner*—Robert R Niquette
(74) *Attorney, Agent, or Firm*—Kenyon & Kenyon LLP

(57) ABSTRACT

Systems, methods, apparatus, and means for improving liquidity in a securities auction include selecting a cover to use to provide general liquidity to the auction, the cover having a plurality of options, calculating a fair value price for each option in the cover, creating an order associated with each of the options, and submitting the orders during the auction.

11 Claims, 5 Drawing Sheets

SYSTEMS AND METHODS FOR IMPROVING AUCTION LIQUIDITY

CROSS-REFERENCE TO RELATED APPLICATIONS

This application is based on, claims priority to, and incorporates herein by references for all purposes, U.S. Patent Application Ser. No. 60/648,916 filed on Feb. 1, 2005 (titled "Systems and Methods for Improving Auction Liquidity").

FIELD OF THE INVENTION

The present invention relates to financial instruments. In particular, the present invention relates to systems and methods for improving auction liquidity.

BACKGROUND

Electronic trading of securities has increased with advances in technology. New trading mechanisms have opened up new markets for different securities. One example of a new trading mechanism is the pari-mutuel derivative call auction ("PDCA") developed by Longitude, Inc.® of Hoboken N.J. Longitude's PDCA enables the creation and trading of new derivatives products. Certain aspects of Longitude's PDCA are provided in their U.S. Pat. No. 6,321,212, the contents of which are incorporated herein in their entirety for all purposes.

In general, Longitude's auction allows traders to participate in new derivatives markets. For example, the assignee of the present application, supports the trading of a new class of derivatives, allowing investors to hedge against surprises in economic statistics by conducting auctions based on U.S. Non-Farm Payrolls and other economic derivatives. As other examples, traders are able to trade in auctions based on U.S. GDP numbers, jobless claims, etc. That is, traders are provided with a direct means for trading the forces that drive the economy, providing new and significant hedging tools.

Each auction may involve a number of participants, including one or more investors, traders, brokers, auction administrators, and market makers. In general, the brokers and traders submit orders to the auction through the auction administrator and the market maker provides liquidity to each order submitted to the auction. In some auctions, the auction administrator and the market maker may be the same entity. In a typical PDCA auction run by Longitude, investors submit their orders to a broker who submits orders to the auction. In a pari-mutuel auction, individual orders to buy are not matched against specific orders to sell; instead, orders define a single set of pari-mutuel prices against which the orders clear. Order pricing and fills are determined using pari-mutuel principles, and each order creates liquidity for other orders.

Currently, market makers provide general liquidity in traditional continuous trading markets by submitting orders for each instrument (for example, a order is submitted for each option at each strike). This requires the creation, submission, and management of a very large number of orders and may limit the number of instruments available to participants in an auction market. As a simple example, in an auction with 20 strikes, over 1427 options are required to cover the auction (including, one forward contract, 19 vanilla calls, 19 vanilla puts, 20 digital calls, 20 digital puts, 18 vanilla straddles, 190 digital ranges, 190 digital strangles, 190 digital risk-reversals, 190 vanilla call spreads, 190 vanilla put spreads, 171 vanilla straddles, 171 vanilla risk-reversals, 19 vanilla knockout calls, and 19 vanilla knockout puts). In general, in an auction with N strikes, there are $(3.5*N^2+1.5*N-3)$ options to choose from, rendering the objective of providing liquidity to both buy and sell orders of all these options a complicated one. To provide liquidity to both buy and sell orders in an auction having 20 strikes, there are over 2,800 option orders to enter and maintain during the auction. That is, providing "general liquidity" (or, liquidity to all instruments in the auction) in such a manner is operationally inefficient.

Further, such an approach is inefficient from a financial risk perspective. The entry of such a large number of orders to achieve general liquidity can expose the market maker to financial risk—the risk associated with the large number of orders may be higher than desired. It would be desirable to provide improved systems and methods that allow a market maker to efficiently achieve general liquidity (or liquidity to all instruments in the auction) for a given level of potential risk allocation.

DETAILED DESCRIPTION

To alleviate the problems inherent in the prior art, embodiments of the present invention provide systems, methods, apparatus, computer program code and means for improving liquidity in pari-mutuel auctions. Applicants have recognized a need for an ability to improve liquidity in pari-mutuel auctions and have developed several embodiments providing improved liquidity. More particularly, Applicants have developed techniques that allow a market maker to provide improved general liquidity through the submission of a selected "cover" defining a number of option orders. For example, in some embodiments, an entity acting as a market maker in a pari-mutuel auction, selects an appropriate type of cover for the auction and submits each of the option orders associated with the selected cover. In some embodiments, one order is submitted for each contingent claim of the auction (in general, each auction has a number of contingent claims determined by the number of strikes in the auction, where each contingent claim represents a contingency which, if occurring in the auction, has a positive payout).

Pursuant to some embodiments, different types of covers may be selected to provide liquidity for different types of auctions. In each embodiment, the market maker is able to achieve a desirable level of liquidity at less risk than previous methods. In particular, pursuant to some embodiments, a market maker need only submit a few orders to achieve liquidity (as opposed to hundreds or thousands of orders as required by previous approaches).

Pursuant to some embodiments, one of a number of different types of covers may be selected, depending on the nature of the auction. For example, the liquidity of some auctions may be directly influenced by using a cover having a plurality of digital options (with one digital option at each contingent claim or strike). The liquidity of some auctions may be best influenced by using a cover having a plurality of vanilla knockout options (creating a number of "fins") at each strike. The liquidity of other auctions may be influenced by using a cover having a plurality of vanilla options forming "tents" at each interior strike of the auction. A combination of one or more covers may also be used to create a set of orders most beneficial to influencing the liquidity of a particular auction. With these and other advantages and features of the invention that will become hereinafter apparent, the nature of the invention may be more clearly understood by reference to the following detailed description of the invention, the appended claims and to the several drawings attached herein.

Figure 1:
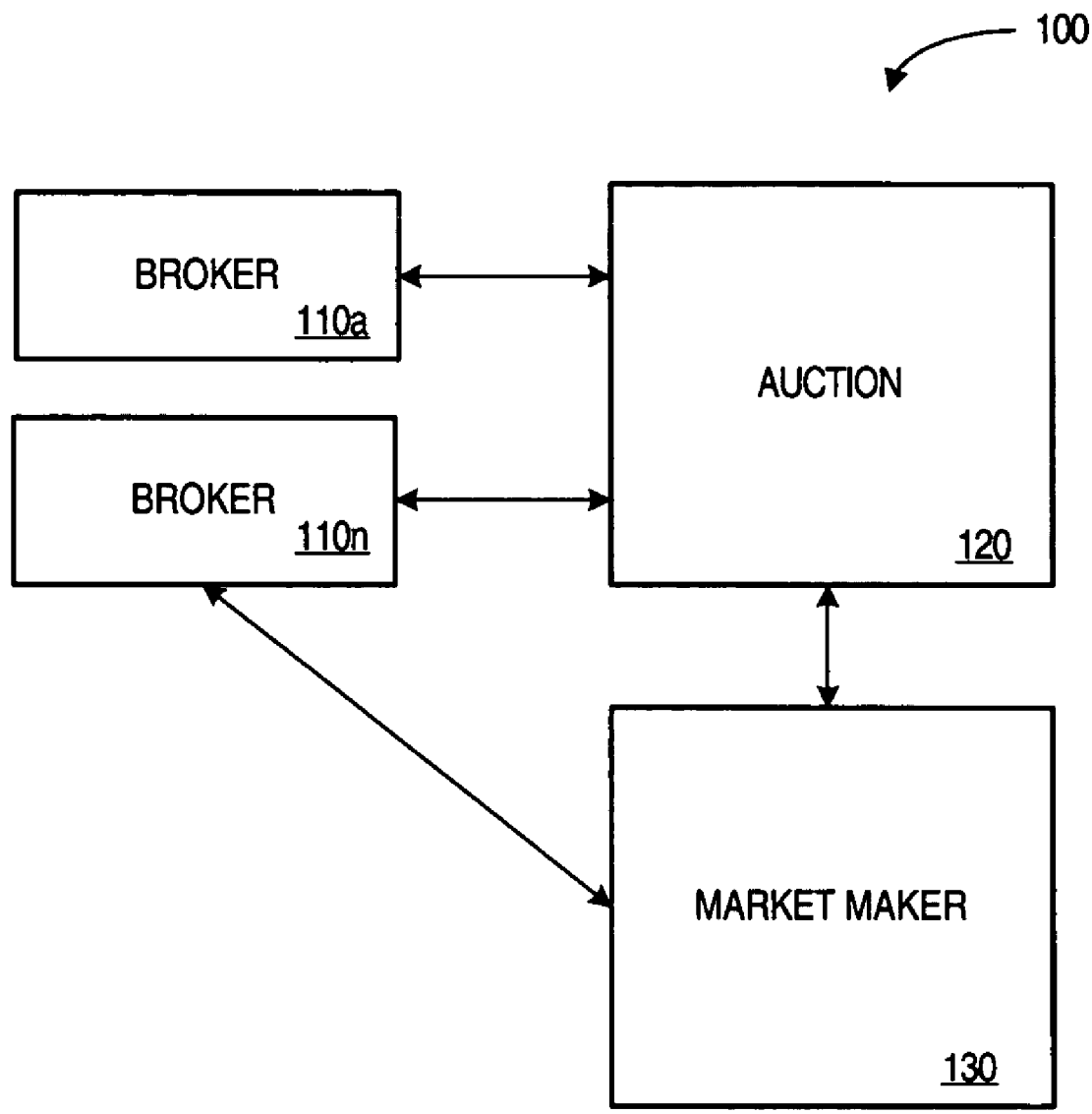
FIG. 1 is a block diagram of a pari-mutuel auction transaction of the type that may benefit from the liquidity techniques of embodiments of the present invention.

An illustrative example auction will now be introduced and used to describe features of some embodiments. The example will be introduced and described by reference to FIG. 1. As shown in FIG. 1, a pari-mutuel auction 100 involves interaction with a number of participants, including one or more brokers 110a-n, a market maker 130 and an auction operator 120. In the example, auction operator 120 operates an economic derivatives auction (e.g., based on the public release of economic data). More particularly, auction operator 120 is operating a pari-mutuel auction based on the release of U.S. Nonfarm Payroll Data by the U.S. government. In the example, the release date of the economic news is Aug. 6, 2004. The auction is conducted prior to the release date (e.g., on Aug. 5, 2004, the day before the release and/or on the morning of August 6, prior to the release). Auction operator 120, prior to conducting the auction, identifies terms of the auction such as, for example, the strike prices of the auction. As a specific example, the strike prices may be set at 0 to +300 (in increments of 25, where each unit represents 1,000 jobs).

Auction operator 120 may operate one or more computer systems such as, for example, one or more Web servers configured to communicate auction data to participants (such as one or more brokers 110 and market makers 130) and to create, manage, and update an auction book. Market maker(s) 130 may also operate computing devices to facilitate interaction with auction operator 120 and broker(s) 110. For example, market maker 130 may operate computing systems allowing market maker 130 to analyze market liquidity, submit orders, analyze pricing and conditions of an on-going auction, etc. Similarly, broker(s) 110 may operate computing devices to submit orders to auction operator 120 for inclusion in the auction. For example, broker(s) 110 may receive orders from traders, investors, or other parties for submission to the auction. Alternatively, or in addition, orders may be placed using a telephone, electronic mail, facsimile, or in any of a number of manners known to those skilled in the art. Some or all of the devices of FIG. 1 may be in communication over a network such as the Internet or the like.

In general, orders submitted to the auction can be modified until the close of the auction. In the example, the auction lasts 1 hour, and orders are filled and executed upon publication of the final prices. Each order is filled objectively based on the limit price. All orders receive the best possible execution at market clearing levels. An order with a limit price above the clearing level will be filled at the clearing level. An order with a limit price at the clearing level will be partially filled at the clearing level. An order with a limit price below the clearing level will not be filled.

As described in the above-referenced U.S. patent assigned to Longitude, Inc., the auction operated by auction operator 120 allows the pricing and allocation of economic derivatives in a pari-mutuel manner. Prices of the derivatives are based solely on relative demand for their implied outcomes. Due to the pari-mutuality, the pricing mechanism is transparent and fair. At the close of the auction, all orders are filled at the clearing price.

As shown, one or more market makers 130 are in communication with auction operator 120 (either directly or through a broker 110; in some embodiments, market maker 130 may also function as a broker 110). Prior to the start of each auction, auction operator 120 may solicit and collect orders from one or more broker(s) 110. The auction is conducted based on the submission of orders from a number of brokers(s) 110. All orders, regardless of source, are combined into one pari-mutuel pool. Applicants have discovered that a market maker 130 may improve the liquidity of an auction by taking one or more of several actions prior to, or during an auction. Referring again to the example auction (based on the August release of Nonfarm Payroll data by the U.S. Government), the auction (like other pari-mutuel auctions of derivatives), may be defined as having a number of fundamental contingent claims, where each will have a positive payout if the release of the statistic on which the auction is based falls somewhere within the range of positive payouts.

Figure 2:
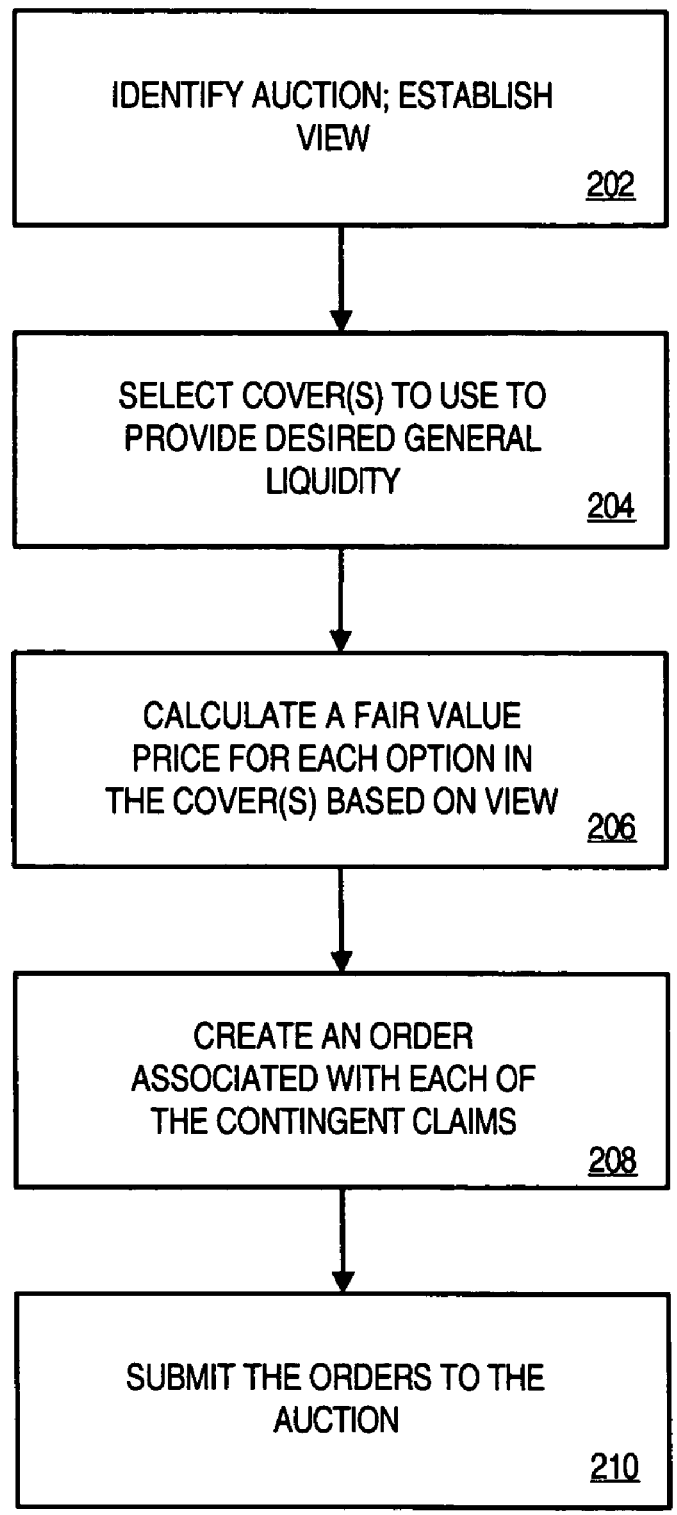
FIG. 2 is a flow diagram of a process for improving liquidity pursuant to some embodiments.

Reference is now made to FIG. 2, where a process 200 is shown. Process 200 depicts process steps that may be performed by a market maker such as the market maker 130 of FIG. 1. For example, some of the steps of process 200 may be performed by market maker 130 prior to the start of an auction (but after the basic terms of an auction have been defined by an auction operator 120). The steps of process 200 (and other processes described herein) may be performed in any order practicable.

Process 200 begins at 202 where a particular auction is identified. For example, if the market maker 130 will be making the market and participating in the August 5 auction (based on the August 6 release of Nonfarm Payroll data), processing at 202 may include the entry or selection of data identifying that particular auction. As a further example, processing at 202 may include interaction between market maker 130 and auction operator 120 to retrieve identifying information associated with the particular auction (and to retrieve information regarding the various strikes and terms of the auction as well). This interaction may be conducted, for example, over a network interface facilitating communication between market maker 130 and auction operator 20.

Processing at 202 also includes determining a "view" or the market maker's expectations of the outcome of the auction. In the example, market maker 130 may (upon analysis of the relevant economic data), establish a view that the August 6 Nonfarm Payroll release will be 150 with a standard error of 75 (in units of 1,000 jobs). Market maker 130 will use this view to calculate a fair value price for option orders entered pursuant to the present invention.

Processing continues at 204 where market maker 130 selects one or more "covers" to provide desired general liquidity to the auction. For example, pursuant to some embodiments, market maker 130 selects one of a "digital cover", a "fundamental cover" or a "vanilla cover" as described below in conjunction with FIG. 3. In general, a digital cover is selected to provide liquidity to any digital-style option order, and a vanilla cover is selected to provide liquidity to a vanilla-style option order. A fundamental cover may be selected to provide liquidity to either style of order. Processing at 204 may include determining which of these covers (or combinations thereof) will provide the desired liquidity. Continuing the example, market maker 130 may elect to provide $1 Million of the fundamental cover. In the fundamental cover, the number of options is twice the number of strikes.

Processing continues at 206 where market maker 130 calculates a fair value price for each option in the cover (or covers) implied by the market maker's view established at 202.

Processing continues at 208 where market maker 130 creates an order associated with each of the contingent claims of the selected cover. The order is created based on the cover type selected at 204 and the fair value determined at 206. Each order has a limit price calculated at a selected discount (or, if selling, at a premium) to its option's respective fair value price. In some embodiments, processing at 202-208 is performed prior to the start of an auction (but after terms of the auction are specified by the auction operator 120). Market maker 130 may hold the orders created at 208 until the auction starts. At 210, the orders are submitted to the auction. In some embodiments, the orders are submitted in a group (e.g., at the start, or shortly after the start, of the auction). In some embodiments, the orders are placed in a phased release. For example, market maker 130 may select a time period over which the orders will be released and the orders will be uniformly (or randomly) released over that time period. As an example, if there are 20 strikes in the auction, the market maker may create 40 orders if using a fundamental cover, or 20 if using a vanilla cover. The market maker may choose to release the orders over a period of 10 minutes, and two orders may be submitted to the auction every minute during that period. Orders may be submitted in any of a number of different ways to achieve desired results.

Figure 3:
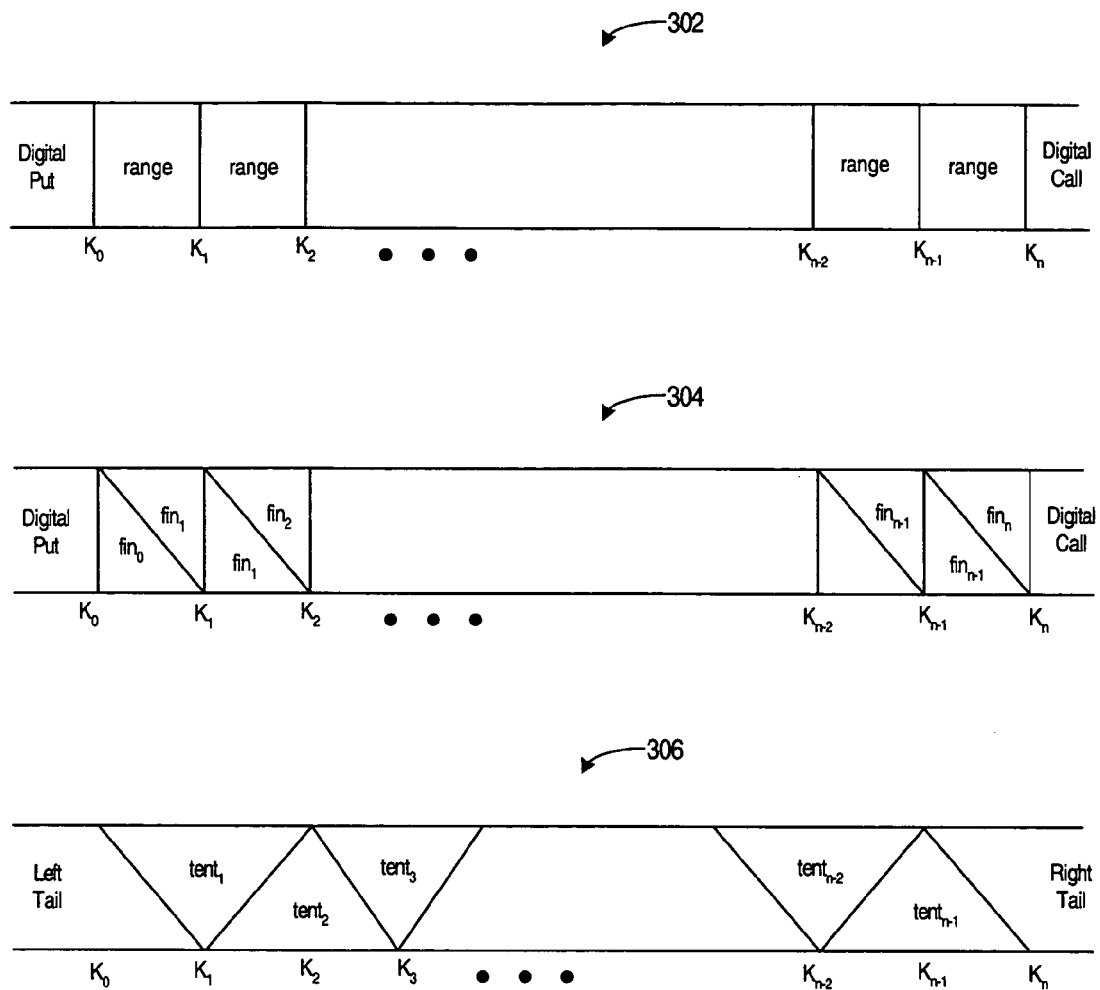
FIG. 3 is a diagram depicting different covers to provide general liquidity to an auction pursuant to some embodiments.

Reference is now made to FIG. 3, where three different covers used to provide general liquidity to an auction are shown. The first cover (shown as item 302, and referred to herein as a "digital cover"), is a digital cover which is adapted to provide general liquidity to any digital-style option order (but does not provide liquidity to any kind of vanilla option order). The third cover (shown as item 306, and referred to herein as a "vanilla cover") provides general liquidity to any kind of vanilla-style option order (but does not provide liquidity to any kind of digital option order). The second cover (shown as item 304, and referred to herein as a "fundamental cover") provides general liquidity to all kinds of option orders without prejudice.

Based on the analysis described above in conjunction with FIG. 2, a market maker 130 may elect to create a number of digital options as shown in item 302. Item 302 shows a series of digital options, with a digital option submitted at each contingent claim of the auction (e.g., a number of digital options are submitted to cover the auction event space). A market maker may determine that a fundamental cover (having a number of vanilla knockout options) provide desirable results and may submit orders as shown at 304, where a series of vanilla knockout option orders are created (defining a fin at each contingent claim of the event space).

As a further example, a market maker may determine that a number of vanilla option "tents" provide desirable results and may submit orders as shown at 306. Those skilled in the art will appreciate that other order types may also be used, so long as a plurality of orders are created and submitted across the contingent claims of the auction. In some embodiments, an order is created for each contingent claim. The market maker may analyze the effect of different numbers, types, and combinations of orders prior to participation in the auction to identify the orders and covers that will provide the most desirable results (e.g., such as the greatest increase in liquidity of the auction for a given level of potential risk).

In some embodiments, the fundamental cover 304 is used to provide general liquidity to any type of option order. However, when the auction underlying is the settlement price of a traded instrument, Applicants have determined that it can be desirable to provide more liquidity to vanilla-style instruments and only a limited amount of liquidity to digital-style instruments. For example, market maker 130 may decide to put 90% of its liquidity in the vanilla cover 306 and only 10% in either the digital cover 302 or the fundamental cover 304.

As a specific example, to provide general liquidity to Non-farm Payrolls, the market maker 130 may choose to use the fundamental cover 304. The market maker 130, based on it's view, may decide to enter $1 Million of fundamental cover 304 (that is, each order has an amount equal to $1 Million), with limit prices calculated in line with the market maker's view and multiplied by a discount amount (e.g., 0.80).

As another example, in an auction of an end-of-day settlement price, the market maker may choose to enter $900,000 of the vanilla cover (item 306 of FIG. 3) and $100,000 of the digital cover (item 302), where each order in each cover has a limit price calculated as that implied by the market maker's view and multiplied by a discount (e.g., 0.80). In this manner, the market maker 130 is able to quickly and efficiently provide general liquidity to the auction.

Figure 4:
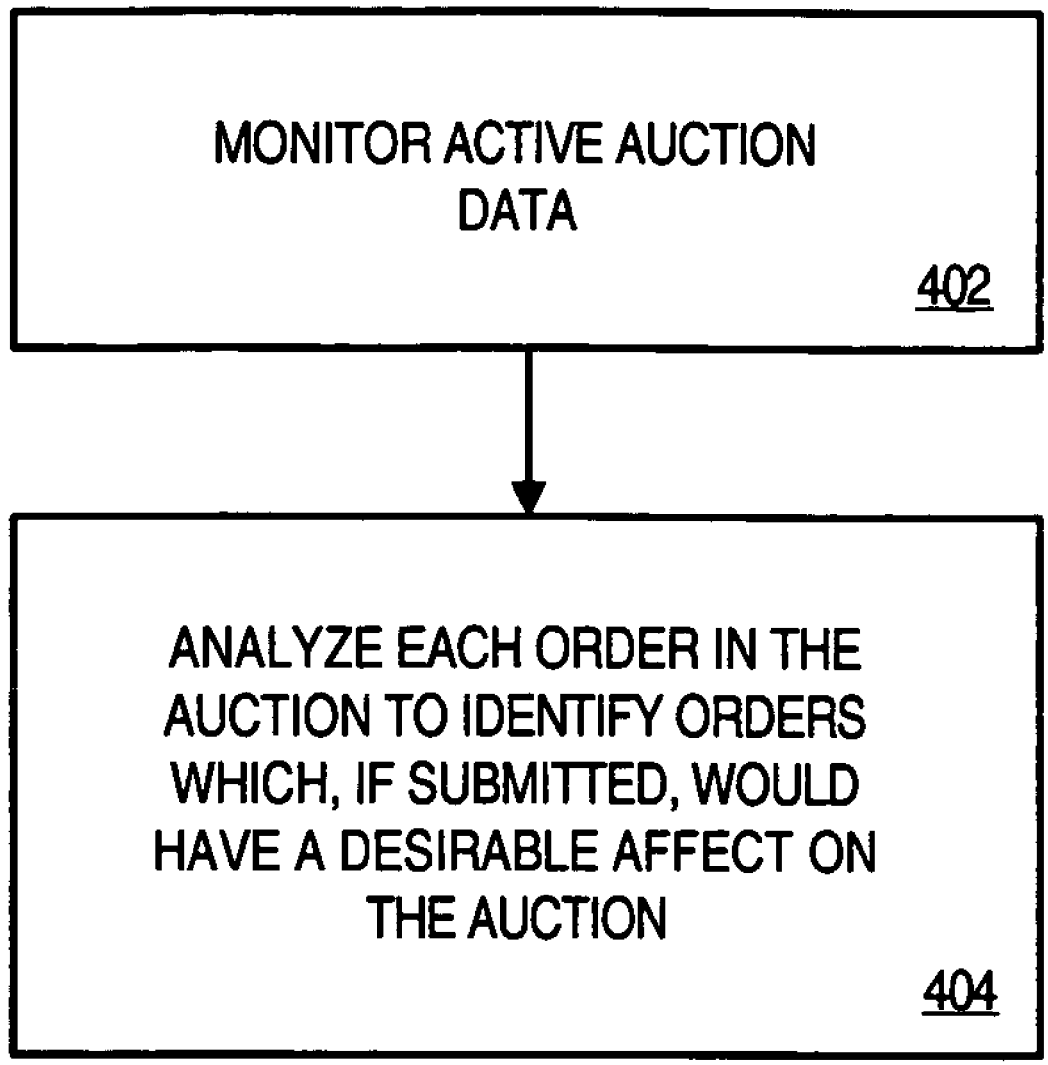
FIG. 4 is a flow diagram of a further process for improving liquidity pursuant to some embodiments.

Reference is now made to FIG. 4, where a process 400 is shown to improve liquidity during the conduct of an auction. Process 400 may be performed by an entity such as market maker 130 during a pari-mutuel auction. Process 400 begins at 402 where market maker 130 monitors active auction data. For example, this monitoring may be performed using a computing device (or devices) in remote communication with auction operator 120. Auction operator 120 may, for example, provide market maker 130 (and other auction participants) a real time or substantially real time feed of auction data. This feed may be, for example, provided over an Internet connection or other communication path. As an example, (again referring to the example auction of August 2004 Nonfarm Payroll data) market maker 130 may receive the following information associated with each order in the auction: an order identifier, a side (buy or sell), an amount, a type of the order (e.g., digital range, digital call, etc.), a limit amount, a strike price (or range, if appropriate), a volume, and a premium. This information may be received along with a time stamp and an auction identifier.

Process 400 continues at 404 where market maker 130 analyzes each order in the auction to identify the order(s) that, if submitted, would have a desirable effect on the auction. More particularly, pursuant to some embodiments, processing at 404 involves identifying orders that could be submitted which would have the greatest impact on the auction's liquidity for the least cost (that is, the order having the greatest "power" or impact on the auction). In some embodiments, this processing is performed automatically by code associated with a computing device operated by market maker 130. In some embodiments, a trader or administrator operating a market maker computing device initiates the analysis (e.g., by initiating an enhanced market maker analysis module).

In some embodiments, a trader or administrator operating a market maker computing device may input auction assumptions. These auction assumptions will affect the identification of the order(s) having the greatest power or impact on the auction. For example, a trader or administrator may specify assumptions associated with the distribution curve of orders in the auction, including the center, dispersion and distribution of orders. Further, assumptions associated with the risk premium (e.g., the amount the market maker is willing to put at risk in the auction), and skew may also be specified. Other criteria or assumptions may also include: the smallest price increment (e.g., 0.001), the minimum sell price (e.g., 0.01), the sell markup (if any, e.g., 0.2), whether buys are reduced, the source of the order (here, "market maker"), etc.

Based on this input information, and the auction data received at 402, embodiments calculate the order (or orders) that will have the greatest power or impact on the liquidity of the auction. In general, the "power" of an order at any given moment in the course of an auction is defined as follows. The "premium" of an order is generally defined herein as the largest obligation the order ties the participant to, at its current level of indicative fill. If the order is an option buy order, the premium is simply the usual option premium for the indicative fill the order is receiving at that given moment. For a sell order, the premium is the worst payout the seller may have to make, net of the premium the seller will receive, at its indicative fill level.

Based on this, the "power" of a potential new order for a particular instrument (for a certain amount, at a specific limit price) is the ratio of the increase (or decrease) in the sum of the premium of all the current orders in the auction (excluding the market making orders themselves), divided by the premium of the order being considered. The higher the power of the potential new order, the greater its potential capacity for increasing the fills of other orders in the system.

In some embodiments, processing at 404 includes performing a limit order or auction book search to view a set of order amounts, prices and sides as well as the details regarding the calculated "power" each order would have if submitted. In some embodiments, a user interface is provided which allows a trader or administrator to enter criteria to view the order book. In some embodiments, a user may specify terms of a proposed order (including the option type, the lower strike, the upper strike, and the side) and the system will calculate and return a list of possible orders that match the specified terms of the proposed order. As a specific example, a user may submit the following proposed order terms:

Option Type: digital range
Lower Strike: 100
Upper Strike: 200
Side: buy

In response, the system may return the following potential orders (each a digital range, with strikes of 100, 200 on the buy) that could be submitted by the user:

| Side | Limit | Volume | Premium | D-Premium | Power |
|------|-------|--------|---------|-----------|-------|
| Buy | 0.384 | 1,537,203 | 590,286 | 2691,733 | 3.56 |
| Buy | 0.354 | 1,491,576 | 528,018 | 2622,306 | 3.97 |
| Buy | 0.325 | 834,917 | 271,348 | 1243,936 | 3.58 |
| Buy | 0.310 | 614,021 | 190,347 | 1207,587 | 5.34 |

The user, perusing this information, may determine that the order with a limit price of 0.310 is the most desirable order to submit (as it has been calculated as having the greatest potential impact or power to affect the liquidity of the auction). As a result, the market maker may submit a digital range order with a limit of 0.310. In this manner, embodiments allow market makers in pari-mutuel auctions to improve auction liquidity during the conduct of an auction. Other tools may be provided to market makers, including tools to assess an auction's risk profile (including risk profiles associated with payouts for market making and payouts for clients). Process 400 is repeated throughout the course of an auction as desired by market maker 130.

Figure 5:
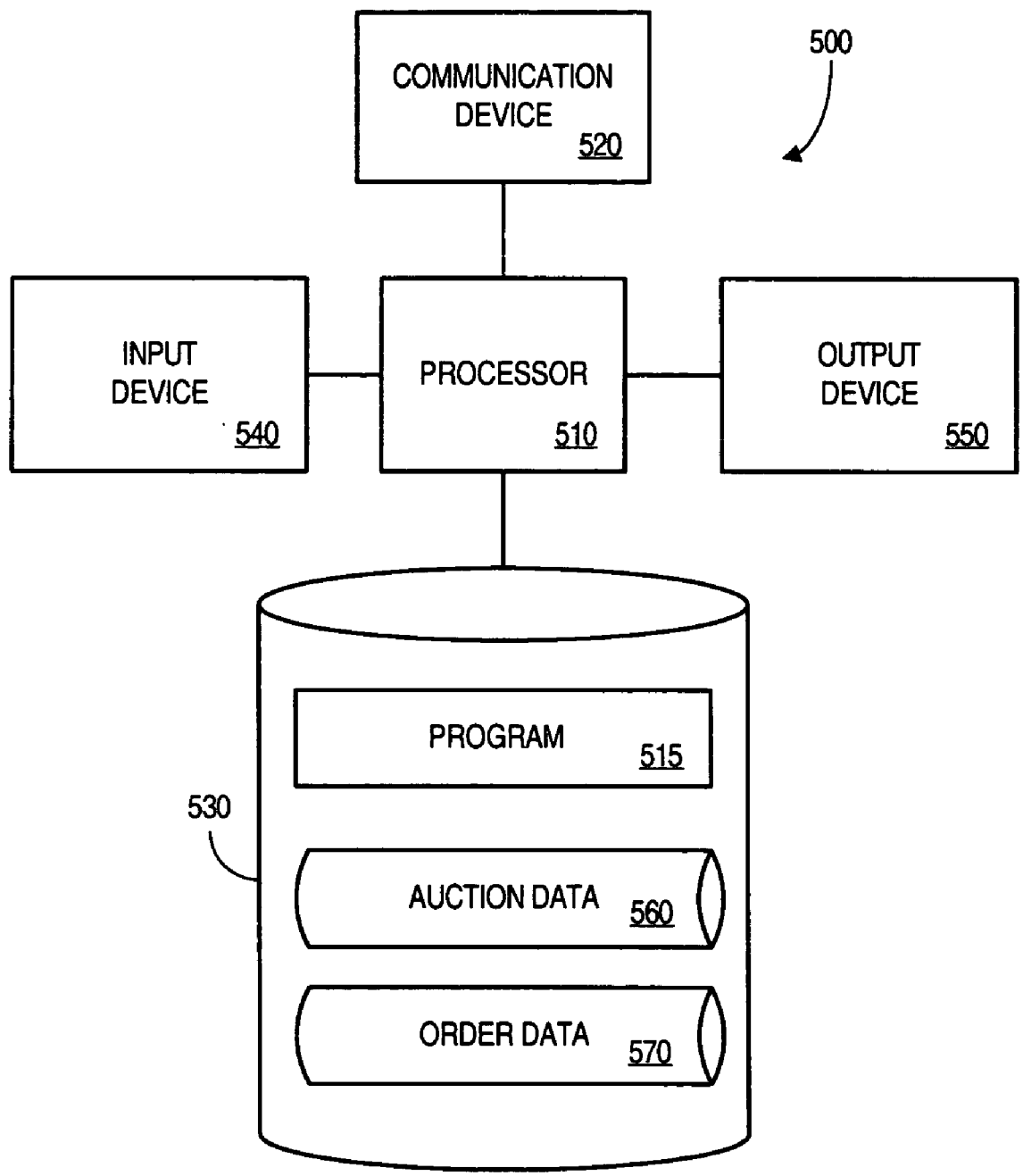
FIG. 5 is a block diagram of a device pursuant to some embodiments.

Referring now to FIG. 5, a device 500 is shown which may be operated by, or on behalf of, a market maker such as the market maker 120 of FIG. 1. In some embodiments, device 500 is operated by one or more traders or administrators acting on behalf of market maker 120 to improve auction liquidity pursuant to embodiments disclosed herein.

As depicted, device 500 includes a computer processor 510 operatively coupled to a communication device 520, a storage device 530, an input device 540 and an output device 550. Communication device 520 may be used to facilitate communication with, for example, other devices and other participants (such as, for example, devices operated by traders 110, auction providers 130, etc.)

Input device 540 may comprise, for example, one or more devices used to input data and information, such as, for example: a keyboard, a keypad, a mouse or other pointing device, a microphone, knob or a switch, an infra-red (IR) port, etc.

Output device 550 may comprise, for example, one or more devices used to output data and information, such as, for example: an IR port, a docking station, a display, a speaker, and/or a printer, etc.

Storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 530 stores one or more programs 515 or rule sets for controlling processor 510. Processor 510 performs instructions of program 515, and thereby operates in accordance with aspects of the present invention. In some embodiments, program 515 includes rules to implement the liquidity analysis of FIG. 2 and rules to implement the power analysis of FIG. 4. In some embodiments, program 550 may be configured as a neural-network or other type of program using techniques known to those skilled in the art to achieve the functionality described herein.

Storage device 530 also stores one or more databases, including, for example, auction data 560 and order data 570, etc. For example, the auction data 560 may be retrieved from auction provider 130 (e.g., via a network connection or the like). Order data 570 may include information received from one or more traders 110 and/or information entered via input device 540.

Although the present invention has been described with respect to a preferred embodiment thereof, those skilled in the art will note that various substitutions may be made to those embodiments described herein without departing from the spirit and scope of the present invention. With these and other advantages and features of the invention that will become hereinafter apparent, the nature of the invention may be more clearly understood by reference to the above detailed description of the invention, the appended claims and to the several drawings attached herein.

What is claimed is:

1. A computer-implemented method of improving liquidity in a securities auction, comprising:

storing, by a processor and in a storage device, a plurality of predetermined covers that each has a plurality of options;

providing, by the processor, a user interactive computer interface, via which at least one of the plurality of covers is selectable, each cover being referenceable multiple times for selection from the storage device for a plurality of auctions, the selection of the cover being dependent upon the type of security of the auction;

selecting the at least one cover;

calculating, by the processor, a fair value price for each option in the selected at least one of the plurality of covers;

creating an order associated with each of the options, the order being created based on the selected at least one of the plurality of covers and the calculated fair value price;

submitting the orders during the auction via a computer;

receiving, by the processor, a feed of data identifying current orders in said auction;

analyzing, by the processor, each of said current orders to identify an order which, if submitted, will cause, compared to the others of said orders, a largest predefined economic effect, wherein, for each of said current orders, the economic effect of the respective order is calculated as a ratio of a change in a sum of the premium of all the current orders in the auction, divided by the premium of the respective order;

providing a user interface for entering parameters of a potential order;

calculating, by the processor, a list of possible orders for the potential order that match the entered parameters, the possible orders having characteristic information; and displaying the characteristic information to the user; wherein:

the at least one cover is at least one of a fundamental cover, a vanilla cover, and a digital cover; and the data identifying current orders in said auction includes at least one of an order identifier, a specification as a buy, a specification as a sell, an amount, a type of order, a limit amount, a strike price, a volume, and a premium.

2. The method of claim 1, further comprising determining probable outcome of the auction, wherein the fair value price for each option is calculated based at least in part on the determined probable outcome.

3. The method of claim 1, wherein the selected at least one cover comprises a first and a second cover.

4. The method of claim 1, wherein said submitting is performed at substantially the same time.

5. The method of claim 1, wherein said submitting is performed over a predefined time period.

6. The method of claim 1, further comprising:

identifying, by the processor, one or more types of said orders that will best improve said liquidity.

7. An apparatus for improving liquidity in a securities auction, comprising:

a processor; and a storage device in communication with said processor, storing a plurality of predetermined covers that each has a plurality of options, and storing instructions adapted to be executed by said processor to cause the processor to:

provide a user interactive interface via which at least one of the plurality of covers selectable, each cover being refrenceable multiple times for selection from the storage device for a plurality of auctions, the selection of the cover being dependent upon the type of security of the auction;

calculate a fair value price for each option in the selected at least one of the plurality of covers;

create an order associated with each of the options, the order being created based on the selected at least one of the plurality of covers and the calculated fair value price;

submit the orders during the auction;

receive a feed of data identifying current orders in said auction;

analyze each of said current orders to identify an order which, if submitted, will cause, compared to the others of said orders, a largest predefined economic effect, wherein, for each of said current orders, the economic effect of the respective order is calculated as a ratio of a change in a sum of the premium of all the current orders in the auction, divided by the premium of the respective order;

provide a user interface for entering parameters of a potential order;

calculate a list of possible orders for the potential order that match the entered parameters, the possible orders having characteristic information; and display the characteristic information to the user; wherein:

the at least one cover is at least one of a fundamental cover, a vanilla cover, and a digital cover; and the data identifying current orders in said auction includes at least one of an order identifier, a specification as a buy, a specification as a sell, an amount, a type of order, a limit amount, a strike price, a volume, and a premium.

8. The method of claim 1, wherein the feed of data identifying current orders in said auction is received in real time.

9. The method of claim 1, wherein the characteristic information includes at least one of side, limit, volume, premium, D-premium, and power.

10. The method of claim 1, wherein the submission of the orders during the auction is performed such that data regarding the orders is accessible by the processor for analysis by the processor to select additional covers.

11. A computer-implemented method of improving liquidity in a securities auction, comprising:

storing, by a processor and in a storage device, a plurality of predetermined covers that each has a plurality of options;

selecting, by the processor, at least one of the plurality of covers, each cover being referenceable multiple times for selection from the storage device for a plurality of auctions, the selection of the cover being dependent upon the type of security of the auction;

calculating, by the processor, a fair value price for each option in the selected at least one of the plurality of covers;

creating an order associated with each of the options, the order being created based on the selected at least one of the plurality of covers and the calculated fair value price;

submitting the orders during the auction via a computer;

receiving, by the processor, a feed of data identifying current orders in said auction;

analyzing, by the processor, each of said current orders to identify an order which, if submitted, will cause, compared to the others of said orders, a largest predefined economic effect, wherein, for each of said current orders, the economic effect of the respective order is calculated as a ratio of a change in a sum of the premium of all the current orders in the auction, divided by the premium of the respective order;

providing a user interface for entering parameters of a potential order;

calculating, by the processor, a list of possible orders for the potential order that match the entered parameters, the possible orders having characteristic information; and displaying the characteristic information to the user; wherein:

the at least one cover is at least one of a fundamental cover, a vanilla cover, and a digital cover; and the data identifying current orders in said auction includes at least one of an order identifier, a specification as a buy, a specification as a sell, an amount, a type of order, a limit amount, a strike price, a volume, and a premium.

* * * * *

UNITED STATES PATENT AND TRADEMARK OFFICE
CERTIFICATE OF CORRECTION

PATENT NO. : 7,606,763 B2  Page 1 of 1
APPLICATION NO. : 11/342163
DATED : October 20, 2009
INVENTOR(S) : Oliver L. Frankel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Twelfth Day of October, 2010

David J. Kappos
*Director of the United States Patent and Trademark Office*